April 2, 1946.   A. E. BINGHAM   2,397,640
DAMPING VALVE FOR SHOCK ABSORBERS, RESILIENT DEVICES,
DASHPOTS AND THE LIKE
Filed July 9, 1943
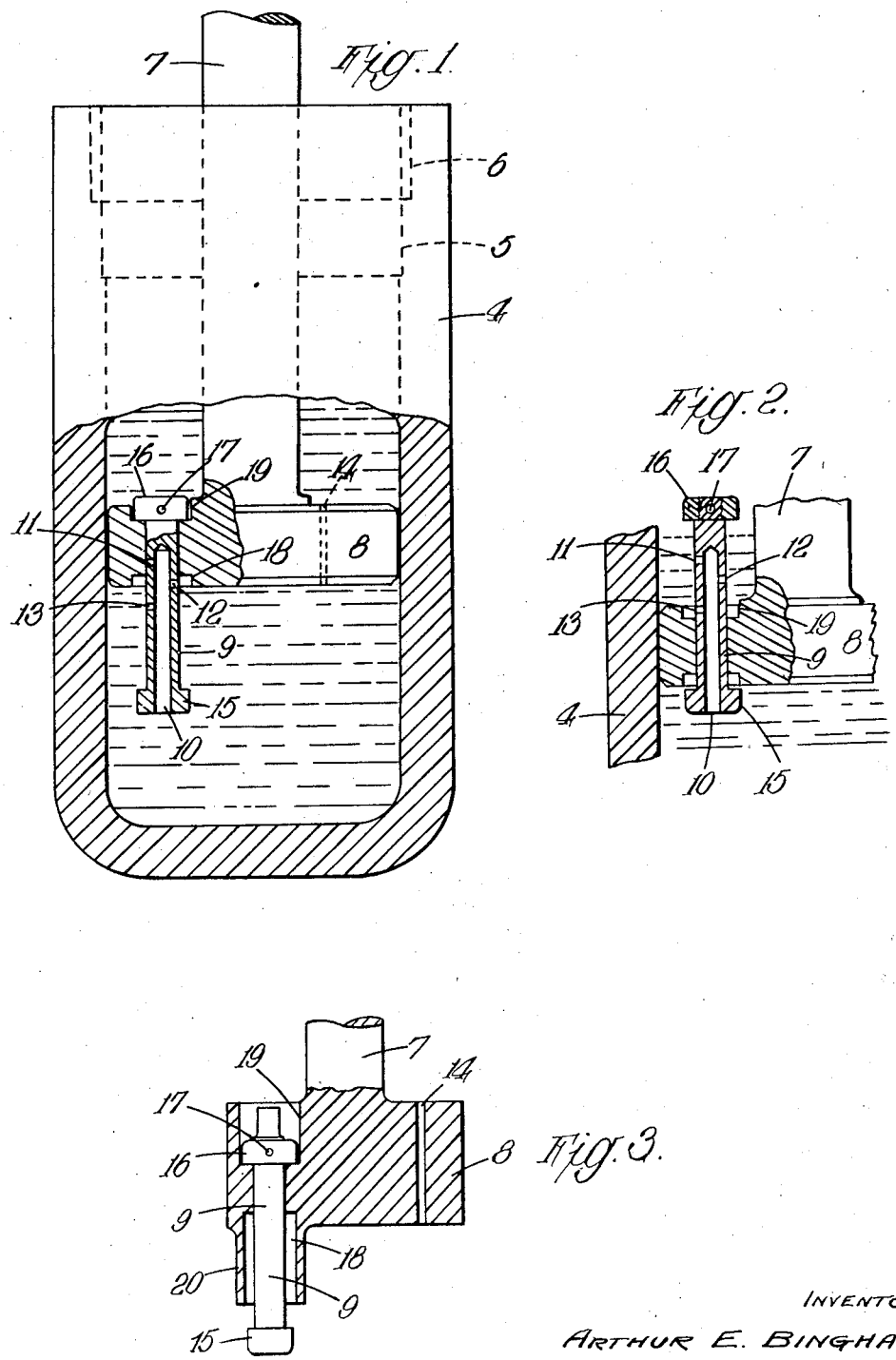
INVENTOR
ARTHUR E. BINGHAM,
BY Reynolds & Beach
ATTORNEYS Patented Apr. 2, 1946

2,397,640

UNITED STATES PATENT OFFICE 2,397,640

DAMPING VALVE FOR SHOCK ABSORBERS, RESILIENT DEVICES, DASHPOTS AND THE LIKE

Arthur Edward Bingham, Cheltenham, England, assignor to Dowty Equipment Limited, Cheltenham, England Application July 9, 1943, Serial No. 494,074
In Great Britain July 28, 1942

1 Claim. (Cl. 188—96)

The present invention relates to a highly-loadable resilient device embodying a metering valve which provides for variation of damping effect.

In certain shock-absorbers, resilient devices and dashpots in which liquid is employed either as the compressible medium or in conjunction with a more readily compressible medium such as air or other gas to afford resilience, it is known to provide for a damping effect varying in the course of a plunger stroke in one or both senses of travel by providing the plunger with a metering device in the form of a ported valve slidable relatively to the plunger to vary the orifice area for flow of liquid therethrough according to the position and/or direction of travel of the plunger in relation to the cylinder. An example of such a metering valve is found in the specification of my United States Patent No. 2,356,563, issued August 22, 1944, of which this application is a continuation in part, but in that case the invention is embodied in an arrangement in which the resilience in the shock-absorber or spring unit is provided by the compression of liquid under operating loads.

Essentially, the present invention is concerned with the type of resilient device which embodies a chamber glanded for the reception of a relatively slidable plunger which mounts within the chamber a damping head fitting the bore of the chamber to partition it in an axial sense, the damping head being provided with a metering valve to provide, by virtue of its movement relative to the head, variable flow orifice area (and thereby variation of restriction of damping effect) in the course of plunger travel. For convenience, such a device can hereinafter be designated "a resilient device of the kind hereinbefore specified."

It is an object of the present invention to provide an efficient and durable metering valve for satisfactory operation in a resilient device of the kind hereinbefore specified which may be subject to very high internal loading.

It is a further object of the invention to provide a metering valve in a resilient device of the kind hereinbefore specified which can seat with a cushioned effect at an end of its travel whereby to prevent any undesirable hammering effect in operation.

Other objects of the invention will be made apparent from the ensuing description.

It may here be stated that the hammering may become particularly violent under the high operating pressures encountered in resilient devices wherein the resilience results from compression of liquid; but the invention is not necessarily limited to arrangements in which the resilience results from liquid compression, for it is equally applicable and equally useful in all types of resilient devices which may be subject to high internal loading in operation and where variable damping is to be provided for.

In most cases the cushioning will need to be provided for at each end limit of the valve travel, but there may be cases in which it will suffice to provide it at one end limit only.

In order that it may be clearly understood and readily carried into effect, the invention is hereinafter described with reference to the accompanying diagramamtic drawing, of which:

Figure 1 is a fragmentary side elevation mainly in section of a resilient unit in the form of a liquid spring which embodies a variable damping valve according to the present invention, the plunger being shown in progress of its recoil or re-extension stroke relative to the cylinder;

Figure 2 is a fragmentary view showing a part of the plunger head submerged in the liquid in the cylinder with the metering valve just about to seat resiliently near the end of its travel relative to the damping head in the progress of the compression stroke of the plunger; while Figure 3 is, again, a fragmentary view showing a slightly modified arrangement of damping valve which gives a cushioned seating effect maintained over a longer period than that achieved with the arrangement shown in Figures 1 and 2.

Referring now to Figures 1 and 2 of the drawing, the reference numeral 4 indicates the chamber (usually of cylindrical form) of the resilient unit according to the present invention. The chamber 4 is of robust form, being provided with a packing gland 5 and a closure plug 6, both seen in Figure 1 in dotted lines. The gland is effective to maintain a fluid-tight engagement with the plunger 7, which is slidably engaged through the gland, and which mounts within the cylinder a damping head 8. The damping head 8 is bored to receive the metering valve 9 which has an axial bore 10 extending partly through it, from which axial bore 10 radial ports such as 11, 12 and 13 lead. If the bore 10 does not extend right through the metering valve 9, as is the case in the arrangement illustrated, a primary flow restriction port 14 may be provided, but a separate port 14 will be unnecessary if the bore 10 extends right through the metering valve. The metering valve 9 is provided at one end with an enlarged head 15, which conveniently can be formed integrally with the stem part of the valve, and at the other end there is provided a similar enlargement 16, which conveniently can be screwed on to a spigot fitting and finally fastened by means of the rivet or dowel 17. The damping head 8 of the plunger is provided with a recess 18 for the metering valve head 15 and a recess 19 for the metering valve 17; and it will be seen that the bores of the recesses 18 and 19 are so dimensioned that they provide only a slight clearance about the seated heads of the metering valve, which slight clearance affords a restriction effective to retard escape of liquid trapped between the base of a recess and a cooperating head of the damping valve as it is approaching the end of its stroke.

In the arrangement illustrated the resilient device takes the form of a liquid spring, in which event the maximum available space within the chamber 4 with the plunger fully extended is entirely filled with liquid, which is resiliently compressible as the plunger 7 is caused to enter the chamber under axial load in compression. It is noteworthy that in liquid springing units the damping head 8 always occupies the same space in the entrapped liquid, and therefore does not in operation provide any material contribution to liquid compression, which is substantially entirely dependent upon the extent to which the plunger is caused to enter the chamber under load.

In the arrangement shown with reference to Figure 3, a considerably prolonged cushioning effect is provided for by reason of the fact that the recesses in the damping head which are adapted and arranged for the reception of the cooperating heads on the metering valve are formed considerably deeper than those shown in Figures 1 and 2. In order to accommodate the increased axial length of recess or counterbore, an extension 20 can be provided at at least one face of the damping head within which the extended recess or counterbore is formed. Extensions such as 20 might in some cases be provided at both faces of the damping head.

Although it will generally be preferred to form the recess or counterbore in the damping head, there may be cases in which it may be preferred to provide a projection extending axially from the damping head for cooperation with a recess formed at the inner face of the cooperating damping valve head.

The stem part of the metering valve is a sliding fit in the damping head 8, and it therefore follows that the enlarged heads of the metering valve can engage each its cooperating recess with quite small radial clearance. An advantage which results from forming at least one metering valve head separate from the metering valve itself for attachment thereto is that the arrangement facilitates installation and servicing; but in some cases it may be preferred to form both heads integrally with the metering valve and to locate the valve in the damping head by means of a split bush secured in the damping head in any convenient manner, as is illustrated in my patent referred to above.

In operation the resilient device normally takes its extended form under no-load conditions with the plunger 7 fully extended in relation to the chamber, and in that condition it is preferred that the entrapped liquid is substantially relieved of pressure. With the plunger fully extended in relation to the chamber, the metering valve is in the same position relative to the damping head, as that in which it is shown in Figure 1, but as the compression stroke of the plunger progresses the metering valve 9 moves until the head 15 seats against the base of the recess 18, as is just about to occur in the position shown in Figure 2. The axial movement of the metering valve 9 in relation to the damping head 8 results in the progressive unmasking of the supplementary flow restriction ports 11, 12 and 13, with consequent increase in the available orifice area. On the recoil stroke the metering valve 9 is caused to move back to the position in which it is shown in Figure 1 to provide the increased damping effect required to prevent excessively violent operation in rebound. The means to prevent variation of damping effect are not necessarily confined to the provision of axially-spaced supplementary ports such as 11, 12, and 13, and a tapering duct, or a plurality of tapering ducts, may be substituted therefor; and modifications such as described in the aforesaid Patent No. 2,356,563, copending with this application, can also be incorporated in the metering valve.

It is to be understood that the forms of the invention herewith shown and described are to be taken as preferred examples and that various design modifications may be resorted to without departing from the spirit of the invention or the scope of the claim.

What I claim is:

A resilient device including a damping head reciprocable in a chamber containing fluid, a metering valve extending slidably through said damping head and cooperating therewith to define resistance passage means therethrough from one side of said damping head to the other, and a head on one end of said metering valve, said damping head having a projection of substantial length extending from one face, within which projection is formed a recess adapted to receive said valve head upon approach movement of said heads, such recess being of a size to afford sufficient radial clearance around said valve head for expulsion therebetween of liquid from such recess without retarding appreciably such approach movement of said heads, although sufficiently small to effect cushioning of seating engagement of said heads.

ARTHUR EDWARD BINGHAM.